United States Patent [19]

Kho

[11] 4,273,700

[45] Jun. 16, 1981

[54] POLYOL RESIN BINDER COMPOSITIONS AND PROCESS

[75] Inventor: Khe-Bing J. Kho, New City, N.Y.

[73] Assignee: Reichhold Chemicals, Incorporated, White Plains, N.Y.

[21] Appl. No.: 85,528

[22] Filed: Oct. 17, 1979

[51] Int. Cl.³ .............................................. C08K 3/36
[52] U.S. Cl. ...................................... 260/38; 528/77; 528/79; 528/85; 528/154
[58] Field of Search ...................... 260/38; 528/77, 79, 528/154, 85

[56] References Cited

U.S. PATENT DOCUMENTS

| | | | |
|---|---|---|---|
| 3,164,565 | 1/1965 | Calamari | 528/79 |
| 3,250,745 | 5/1966 | Davis | 528/79 |
| 3,304,286 | 2/1967 | Altscher | 528/79 |
| 3,470,118 | 9/1969 | Ferster | 260/2.5 |
| 3,499,861 | 3/1970 | Kujawa | 528/79 |
| 3,538,040 | 11/1970 | Grazen | 528/154 |
| 3,538,051 | 11/1970 | Higginbottom | 260/38 |
| 3,686,106 | 8/1972 | Tideswell | 528/77 |
| 3,842,036 | 10/1974 | Chow | 260/38 |
| 3,933,727 | 1/1976 | Schmid | 260/37 N |

Primary Examiner—Paul R. Michl

[57] ABSTRACT

A new and improved foundry aggregate binder system and composition is comprised of a mixture of polyols.

28 Claims, No Drawings

POLYOL RESIN BINDER COMPOSITIONS AND PROCESS

BACKGROUND OF THE INVENTION

The present invention relates to a new and improved foundry aggregate binder system and composition containing a mixture of polyols. More particularly, the invention relates to a two-component foundry aggregate binder mixture comprised of (1) a resinous blend including a phenolic resin-based alkoxy polyol and one or more oxylated amines, and (2) a polyisocyanate. The improved foundry aggregate binder system of the present invention possesses the significant advantage of being substantially self-curing at normal foundry temperatures.

The use of curable urethane-based resins as foundry aggregate binders is well known in the art. In the foundry art, cores and molds used in the making of metal castings are generally prepared from a foundry mixture which is composed of an aggregate material which is primarily of foundry sand and a three-component binder system of (1) a polymerizable or curable phenolic-based resin, (2) a polyisocyanate and (3) a catalyst. The inclusion of the three-component urethane binder system with the aggregate forms the foundry mixture which is deposited in molds or shaped to a desired form and brought to a cured state by the presence of the catalyst to produce a molded, self-supporting shape or structure.

To effect curing of the phenolic resins used in foundry binder resin systems, a cross-linking agent such as an isocyanate which reacts with the alkylol end groups of the phenolic resin is used to produce a highly branched infusible polymer. In order to provide a rapid cure at normal foundry temperature, a catalyst is used to increase the activity of the cross-linking process to produce this infusible polymer.

One of the problems in the art has been the lack of ability of urethane resin binder systems to impart rapidly supportive tensile strength, known as green strength or stripping strength, to the aggregate mixture by the curing of the system at normal foundry temperature without the dependency on the inclusion of a catalyst in the resin binder system.

Special types of phenol formaldehyde resins are prevalent in the patent literature for use in the formation of cores or molds for use in the production of metal casting for foundry-shaped articles in which catalysts are used to effect a more rapid cure so that the cure takes place at normal foundry temperatures.

Exemplary of such patents are U.S. Pat. Nos. 3,409,579, 3,429,848, 3,432,457, 3,485,797, 3,676,392, 3,702,316, 3,726,867, 3,933,727 and 4,079,031, all of which disclose various types of foundry sand binder composition formed from a phenol formaldehyde resin, polyisocyanate, and a curing catalyst which may be in a gaseous or liquid form, such as, for example, amines; and liquid amines such as a tertiary amine. To be effective, these patented binders require a special type of phenol formaldehyde containing a benzylic ether linkage.

U.S. Pat. No. 4,079,031 discloses a foundry sand binder system which has as its binder resin component a resole-type phenolic and a minor portion of a polyether polyol which enters the cross-linked network through a linking with the end of an isocyanate chain that has its other end linked to a methylene attached to the phenol portion of the resole-type phenolic resin.

Apart from the field of foundry resins, the use of a mixture of oxyalkylated phenolic-based resin and oxyalkylated amines that react readily with polyisocyanates to form flame-resistant rigid foams is disclosed in U.S. Pat. No. 3,470,118, incorporated by reference and relied upon.

THE PRESENT INVENTION

The present invention contemplates a process for preparing a self-curing coated aggregate product that is substantially self-catalyzed, thereby providing a substantial advantage over prior art compositions and processes. This advance in the art is achieved, in its most essential aspects, by a novel two-component binder resin; the first component being a resin blend or binder composition comprised of one or more alkoxy polyols and the second being an isocyanate.

The resin blend is, preferably, a composition containing a phenolic-based alkoxy polyol(s) and amine-based alkoxy polyol(s). The phenolic polyol constituent is, desirably, a phenol formaldehyde reaction product modified with an aliphatic oxide to yield a phenolic-based alkoxy polyol in which the hydroxy moiety attached to the phenyl group is modified to produce a phenyl ether linkage to a terminal aliphatic carbinol having the following repeating units of the general formula:

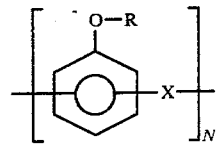

wherein X is $CH_2$ or H and the $CH_2$ group may be in the meta, ortho or para position, or mixtures thereof, R is an aliphatic carbinal radical having 2 to 4 carbonatoms and N is greater than one, to form a polyalkoxy functional structure. The resin blend also contains a tertiary hydroxy diamine polyol of the general formula:

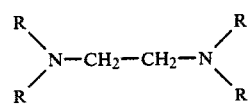

and a tertiary alkoxy hydroxy amine polyol of the general formula:

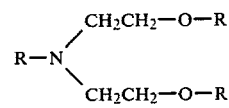

wherein R represents an aliphatic carbinol radical having 2 to 4 carbon atoms. When the two-component binder resin system of the present invention is mixed with the aggregate, there is produced a self-curing coated aggregate product in which the resin mixture rapidly cross-links and cures at normal temperature to an infusible state.

The blend of phenolic-based alkoxy polyol and amine based polyols may also contain other organic oxalkylated polyols such as sucrose-based polyols and glycerine-based polyols and the like. In addition, other materials such as sugars, starches, glycols, and the like, may be added, provided they are compatible and are capable of undergoing oxalkylation in the presence of or during the oxalkylation of the phenol formaldehyde reaction product.

The invention further contemplates a new and improved foundry aggregate binder system and coated aggregate in which one component of the two-component binder system is an oxalkylated phenol formaldehyde reaction product or mixtures thereof, preferably blended with other oxalkylated compatible polyols.

In addition, the present invention encompasses methods for producing a core or mold from a foundry aggregate, such as foundry sand, which is coated with a mixture of a two-component system comprising as one component a phenolic-based alkoxy polyol or a blend of a phenolic-based alkoxy polyol and a tertiary hydroxy amine polyol and a tertiary alkoxy hydroxy amine polyol, and as the other component, a polyisocyanate. The coating is homogeneously distributed over the surface of the aggregate and forms a polyurethane-type binder that is self-curing at normal foundry operating temperatures.

In forming the components of the preferred binder resin composition of this invention, a phenol formaldehyde condensate, alkyl diamine and a dialkyol amine are each reacted with an alkylene oxide to form the phenolic-based alkoxy polyol, the tertiary hydroxy amine polyol, and the tertiary alkoxy hydroxy amine polyol, in situ. This yields a resin binder composition having the phenyl hydroxy group converted to an ether linkage with a pendant carbinol group, thus positioning the hydroxyl group at least two carbons and an oxygen away from the phenyl group. It is believed that this displacement or movement of the hydroxyl group from the influence of the phenyl group allows for a greater activity of the hydroxyl group with the isocyanate group although we do not wish to be bound by any particular theory of operation. This provides for improved green strength because of the self-curing properties of the binder composition which eliminates the use of a catalyst during curing at normal foundry operating temperatures.

It has been found that excellent binder resin mixtures are formed when the alkoxylation of the phenol formaldehyde product and the amine-based polyol are stepwise alkoxylated together, such as in one reaction vessel, to produce as an end product the mixed alkoxylated binder resin mixture.

In making a core or mold, a solution of the binder composition is mixed with the desired amount of foundry sand or aggregate to form a homogeneous mixture. Into this mixture is introduced the required amount of a polyisocyanate solution necessary to cross-link with the hydroxy functional group of the binder to form the thermosetting binder coating on the surface of the foundry sand.

After thorough mixing of the polyisocyanate solution with the foundry sand and binder mixture, it is formed into the desired shaped article by ramming or blowing the mixture into a prepared pattern where the mixture cures at room temperature with the isocyanate groups of the polyisocyanate cross-linking with hydroxy functional groups of the polyol binder resin.

In cases where the foundry sand or conditions in the foundry are such that the ambient temperature or the temperature of the binder-sand mix is below normal temperature, a conventional accelerator may optionally be used to speed the curing of the binder mixture.

The new and improved foundry aggregate binder system of the present invention provides striking advantages over known binders. As already mentioned, the instant binder is substantially self-catalyzed and, therefore, eliminates the need for these catalyst constituents found in other commercial systems. This self-curing nonetheless results in a coated aggregate which exhibits high tensile or green strength. And, all of this is achievable at normal room temperatures under typical foundry conditions. Other advantageous properties of foundry aggregate consolidated with the binder of the present invention, include:

(a) improved moisture resistance
(b) high binder composition coverage of the specific surface of the aggregate
(c) high tensile strength
(d) high leveling characteristic in the mold
(e) excellent plasticity and flowability for filling the molds
(f) excellent bench life, and
(g) freedom when cured of surface cracks and contamination
(h) excellent mold release characteristics The phenols which are most useful, and thus preferred in the formation of the phenolic-based alkoxy polyol, are the monohydric phenols which have at least two hydrogen atoms reactive towards an aldehyde. Exemplary of suitable phenols are: phenol, ortho cresol, para cresol, 3,5-dimethylphenol, 2,5-dimethylphenol, ortho ethylphenol, para ethylphenol, ortho isopropylphenol, para isopropylphenol, ortho propylphenol, para propylphenol, ortho butylphenol, para butylphenol, ortho tertiary butylphenol, para tertiary butylphenol, ortho phenylphenol, para phenylphenol, monohaloparaphenol, monohaloorthophenol and the like. The preferred phenol is an unsubstituted phenol because it imparts outstanding properties to the final product as will be seen below.

Typical of the aldehydes which can be employed in the production of the phenolic-bases alkoxy polyol are, among others, formaldehyde or paraformaldehyde, acetaldehyde, propionaldehyde, butyraldehyde, valeraldehyde, hexaldehyde, heptaldehyde or the like. The preferred aldehyde is formaldehyde because it imparts outstanding properties to the final product as will be seen below.

The nitrogen-bearing reactants that can be successfully used in the formation of the desired oxyalkylated amines comprise, among others, diethanolamine, triethanolamine, dipropanolamine, tripropanolamine, dibutanolamine, tributanolamine, alkylenediamines like ethylenediamine, dialkylenetriamines like diethylenetriamine, and the like. The preferred amines are alkanol amines and alkylenediamine and mixtures thereof because they impart outstanding properties to the final product, as will be seen below.

The aliphatic oxides utilized in preparing the resin blend are the 1,2-epoxides which react with the novolacs and the amines; representative of which are ethylene oxide, propylene oxide, butylene oxide and styrene oxide. Propylene oxide is the preferred alkylene oxide because it imparts outstanding properties to the final product, as will be seen below.

While the phenolic-based alkoxy polyols may be used alone as the binder resin component to be reacted with the isocyanate, it is preferred that they be further blended with one or more oxyalkylated amine polyols or other polyols.

The ratio of the phenolic-based alkoxy polyol to oxyalkylated amine polyols may range from 100:0 percent to about 15.85 percent, based upon the total weight of the resin blend.

The proportion of the reactants employed to prepare the preferred phenolic resins and the conditions under which they are reacted can be varied over a wide range. A desirable molar ratio of phenol-formaldehyde is from 10:5 to 10:8. As a rule, the reactants are heated in the presence of oxalic acid and the temperature is kept at approximately 80° C. until the exothermic reaction has subsided, whereupon the condensation is brought to completion by additional heating.

After removal of the water, the volatiles are stripped off and, in the case where propylene oxide is used, the resin is ready for oxyalkylation. The preferred method to carry out this oxyalkylation is to react 1 mol of phenolic hydroxyl with at least 1 mol of propylene oxide by adding the latter ingredient slowly in the presence of a catalyst, such as benzyltrimethylammonium-methoxide, reacting the same at about 135°–140° C., and stripping off the volatiles. The proportion of the reactants employed to prepare the propoxylated amine and the conditions under which they were reacted can be varied over a wide range.

A desirable molar ratio of alkanol amine to propylene oxide is 14:45.5. The condensation is advantageously accomplished under pressure in an autoclave and the exothermic reaction is controlled by cooling. The preferred reaction temperature is 120°–160° C. The propoxylation can be considered complete when the calculated amount of propylene oxide is consumed. After this, the volatiles can be stripped off.

The condensation products produced by the general method described herein can be used to form aggregate resin binder compositions by mixing from about 10 to about 40 percent by weight of the phenolic-based alkoxy polyol and from about 90 to about 60 percent by weight of a mixture of the tertiary hydroxy diamine and the tertiary alkoxy hydroxy amine, all based on the total weight of the resin binder composition.

It has been found that excellent results are obtained when the mixture of amine polyols contains from about 10 percent to about 90 percent of oxyalkylated tertiary hydroxy diamine and from about 90 percent to about 10 percent of the oxyalkylated tertiary alkoxy hydroxy amine, based on the weight percent of the total mixture of amine polyols.

In the oxyalkylation of the polyols, a substantial portion of the hydroxyl moieties of the polyols are reacted with alkyl oxide to produce the either linkages. It is generally preferred that from about 40 to 100% of the hydroxyl moieties be oxyalkylated, and it is most preferred to oxyalkylate from about 80 to about 100% of the hydroxyl moieties of the polyols.

The polyol resin binder is made by blending alkoxylated phenolic-based resins with alkoxylated amines. Since the alkoxylated phenolic-based resins are either solids or semisolids at room temperature, the blending operation is conveniently conducted at elevated temperatures, although it could be done at low or room temperature, if necessary or desirable.

In forming the self-curing binder coated aggregate of this invention, a two-component system is employed which includes) (a) polyol binder resin blend and (b) polyisocyanate. It will be appreciated that both the polyol binder resin blend and/or the polyisocyanate may be used without the inclusion of a solvent. The mixing of the components, however, with an aggregate may, in some cases, require that either or both of the components be further solubilized to reduce their viscosity and to insure that ease of mixing and total wetting of the surface of the aggregate occurs to produce an even coating of components on the aggregate.

It has been found that good results have been achieved when moderately polar solvents and aromatic solvents are used. The solvent used, of course, must be compatible with the resin binder and the polyisocyanate. Suitable aromatic hydrocarbon solvents include benzene, toluene, xylene, ethyl benzene, naphthalene and the like and mixtures thereof. Suitable moderately polar solvents include butyl cellosolve acetate, butyl carbital, and the like, and mixtures thereof. Also, alcohols and glycols may be used. Typical examples of aromatic hydrocarbon solvents are marketed under the trade names of Aromatic 100, Aromatic 150 and Cyclo-Sol 53.

The quantity of solvent used will, of course, depend in part on the viscosity of the polyol mixture and the viscosity of the polyisocyanate. It has been found that a solvent inclusion of from about 5 to about 50 percent, based on the total weight of the polyol binder resin blend, provides good viscosities and good surface coverage when mixed with the aggregate. Also, a solvent inclusion of from about 5 to about 50 percent, based on the weight of the polyisocyanate, provides good workable viscosities and good intimate mixing with the dispersed binder resin covering the aggregate. Given the teachings of the present specification and these general parameters, those skilled in the art may determine what amount of solvent addition is required.

Exemplary of the polyisocyanates that may be used are the aromatic, aliphatic and cycloaliphatic isocyanates and include polymethylene, polyphenylisocyanate, triphenyl-methane triisocyanate, naphthalene diisocyanate, 4-tert-butyl-m-phenylene diisocyanate, 4,4'-methylene bis (o-tolyl isocyanate), 4,4'-methylene bis (phenyl isocyanate), m-phenylene diisocyanate, 4-chloro 3,3-phenylene diisocyanate, 4,4'-biphenylene diisocyanate, 1,5-naphthylene diisocyanate, 1,4-tetramethylene diisocyanate, 1,10-decamethylene diisocyanate, 1,4-cyclohexylene diisocyanate, 4,4'-methylene bis (cyclohexyl isocyanate), 1,5-tetrahydronaphthylene diisocyanate, toluene-2,4-diisocyanate, 4-chloro-1,3-phenylene diisocyanate, ethylene diisocyanate, propylene 1,2-diisocyanate, cyclohexylene-1,2-diisocyanate, 3,3'-dimethylbiphenylene-4,4' diisocyanate, 3,3'-diphenylbiphenylene-4,4'-diisocyanate, 3,3'-dichlorobiphenylene-4,4'-diisocyanate, triphenylene p-p', p'-triisocyanate, furfurylide diisocyanate, benzene triisocyanate, hexane-1,2,6-triisocyanate; 2,2,4-trimethylhexamethylene diisocyanate; methyl-2,6-diisocyanatocaproate; 4-methyl-1,3-diisocyanatocyclohexane; 4,4'-methylene bis (cyclohexyl isocyanate); methane diisocyanate; N,N'N'-tris (6-isocyanatohexamethylene) biuret; 1-chloro-2,4-diisocyanatobenzene; tris (4-ixocyanatophenyl) methane; naphthalene diisocyanates; bis (2-isocyanatoethyl) benzene; isophorone diamine diisocyanate; triphenylsulfone triisocyanate; trimethylbenzene-2,4,6-triisocyanate; 1-methylbenzene-2,4,6-triisocyanate; diphenyl-2,4,4'-triisocyanate; and 1,6-hexamethylene diisocyanate.

A foundry aggregate, of course, is predominantly formed from a foundry type sand, e.g., quartz or olivine sand, that may have minor amounts of metal oxides therein. Typical foundry aggregates are Wedron Silica Sand No. 5040, Martin-Marietta Sand 50-55 AFS GFN, and the like, and mixtures thereof with other sands.

In the formation of a resinous coated foundry aggregate, small amounts of a conventional accelerator that aids in the formation of the urethane may be used, as desired, to overcome peculiar processing difficulties. Since the strip time is a function of the fineness of the foundry aggregate, the type of aggregate, acid demands of the aggregate, and general foundry conditions, it is possible that conditions are such that a faster strip time is desirable. In such cases a small amount of accelerator aids the self-curing of the resin. The amount of accelerator used may range from about 0.1 to about 15 percent by weight based upon the weight of the binder resin used.

Exemplary of the accelerator that may be used are the tertiary amines, the organo metallic compounds, metal salts, and the like. Accelerators that have provided good results when an accelerator was needed are DABCO R-8020, which is substantially a blend of 20 percent triethylene diamine and 80 percent dimethyl ethanolamine; DABCO DC-1 which is substantially a mixture of organic salts of tertiary amine and an organo metallic compound in an organic solvent; DABCO DC-2, which is substantially a quaternary amine salt; 12 percent manganese octoate, lead naphthenate and the like.

The mixture of polyols present in the foundry binder resin of this invention produces a high hydroxyl content which can range from a hydroxyl number* of 200 to a hydroxyl number of about 600.

*As determined by Standard Method of Test for Hydroxyl Value of Fatty Oils and Acids ASTM Designation: D 1957-63 (Reapproved 1969).

Also, the fact that with the preferred composition a greater weight percent of amine-based polyols are used than the phenolic-based polyol aids in producing a foundry binder that, when mixed with aggregate, exhibits self-curing characteristics. Further, it is believed that the amine polyols provide a dual function, i.e., aids in the acceleration of the cross-linking and provides cross-linking sites.

In the forming of the self-curing nonbaking foundry aggregate binder resin system of this invention, it has been found that the amounts of polyol binder resin blend and polyisocyanate that may be mixed into the foundry aggregate should have an NCO Index of from about 80 to about 150. In all events, there will be added to the resin blend (component I) a cross-linking effective amount of the polyisocyanate (component II). This amount will usually be in the range of from about 40 to about 60 weight percent polyisocyanate based on the weight of the resin blend, for optimum results under normal conditions. But, any amount of polyisocyanate effective to achieve the self-curing of the present aggregate binder system is embraced by the principles of this invention and this shall be the meaning of the term "effective amount" as used herein. The total mixture of polyol binder resin blend and polyisocyanate may be from about 0.5 to about 15 percent by weight based on the weight of the aggregate. It will be appreciated, however, that the total amount of binder resin and polyisocyanate used is a function of the fineness of the aggregate, the physical characteristics of the aggregate, the acid demand of the aggregate, the required core or mold hardness, the mixing procedure, and the set-up time desired. Where a high speed high efficiency type of mixer is used, the amount of polyol binder resin and polyisocyanate may be adjusted to from about 1.0% to about 2.0%.

With the fast self-curing aggregate-binder system of this invention, batch mixing can be accomplished by first charging the polyol binder resin blend into the mixer with a charge of aggregate composed principally of foundry sand, and then mixing at high speed for about one minute. The polyisocyanate is then added and is thoroughly blended into the mixture at high speed for about 30 seconds at which time the aggregate binder resin system is dropped into a core box or mold where hardening takes place. Best molding results are obtained if the foundry sand is dry when mixed and the aggregate binder resin system is rammed or vibrated into the core box or mold to provide proper core box or mold packing, so that the hardened system produces a shaped product with good tensile strength and surface characteristics.

The strip time is normally from about 2 to about 20 minutes, depending on the quality of the prepared foundry sand used. If foundry and/or sand conditions are not normal or a shorter strip time is desired, a conventional accelerator, as previously described, may be used.

Various other additives, such as wetting agents, release agents, core oils, lubricants and the like may also be mixed with the aggregate and resin binders, as desired, by those skilled in the art, as for instance the addition of gamma-amino-propyltriethoxy silane.

The invention will be more readily understood by reference to the accompanying specific examples which are intended as illustrative only rather than as limiting the invention to the specific details set forth therein.

EXAMPLE I

A foundry polyol binder resin was prepared by first charging 6.25 parts by weight of ethylenediamine in a reaction vessel heated to 120° to 130° C., and 24.13 parts by weight of propylene oxide, and holding the reaction vessel in this temperature range for a period of 30 minutes. To the vessel was charged 0.78 parts by weight of catalyst benzyltrimethylammonium methoxide and 19.39 parts of commercially available phenolic resin. To the ingredients in the vessel were then added an additional 28.66 parts by weight of propylene oxide which was digested for one hour. Then 11.83 parts by weight of diethanolamine were added and an additional 8.96 parts by weight of propylene oxide. The reaction products were separated from the reaction mixture by filtering and the resulting propoxylated polyols formed had a hydroxyl number of 520–540.

EXAMPLE II

Five runs were made using 64.8 percent by weight of the polyol product prepared in Example I mixed with 0.2 percent by weight of Silane A-1102[1] and 35 percent by weight of the various solvents, as set forth in Table I.

TABLE I

| | Solvent Added to Polyol Binder Resin | | | | |
|---|---|---|---|---|---|
| Run | Aromatic 150[2] | Aromatic 100[3] | Cyclo-Sol 53[4] | DBE[5] | Butyl[6] Cellosolve Acetate |
| 1 | 35 | | | | |
| 2 | | 35 | | | |
| 3 | | | 35 | | |
| 4 | | | | 35 | |

TABLE I-continued

Solvent Added to Polyol Binder Resin

| Run | Aromatic 150[2] | Aromatic 100[3] | Cyclo-Sol 53[4] | DBE[5] | Butyl[6] Cellosolve Acetate |
|-----|-----------------|------------------|------------------|--------|------------------------------|
| 5   |                 |                  |                  |        | 35                           |

Five aggregate-binder resin systems were formed from an admixture of a foundry sand[7] with the 1 percent of each of the five polyol binder resin solutions based on the weight of the aggregate which was mixed for one minute at slow speed in a Model N-50 Hobart Mixer.

To each of these admixtures was added 1% of a hardener of a polyisocyanate solution based on the weight of aggregate, and uniformly mixed at high speed for an additional half minute. The polyisocyanate solution was 85% Mondur MR[8] and 15% aromatic solvent.

FOOTNOTE
1. amino silane manufactured by Union Carbide Corp.
2. mixture of aromatic hydrocarbon solvents manufactured by Exxon Chemical Co.
3. mixture of aromatic hydrocarbon manufactured by Exxon Chemical Co.
4. mixture of aromatic hydrocarbon solvents manufactured by Shell Co.
5. mixture of dimethyl esters of succinic, glutaric and adipic acids manufactured by E. I. du Pont de Nemours & Co., Inc.
6. ethylene glycol monobutyl ether acetate
7. Wedron Silica Sand No. 5040
8. methylene diphenyl diisocyanate manufactured by Mobay Chemical Co.

Standard AFS 1-inch tensile speciments were made from each sample by using a tensile core box. Tensile strength results (in psi) were obtained from Universal Sand Strength Tensile Machine, and the following data as shown in Table II were produced:

TABLE II

Tensile Strength Development of Foundry Aggregate-Binder Resin

| Run | Strip Time (min) | 1 hour Tensile | 2 hours Tensile | 4 hours Tensile | 24 hours Tensile |
|-----|------------------|----------------|-----------------|-----------------|------------------|
| 1   | 18               | 143            | 263             | 295             | 358              |
| 2   | 18               | 132            | 245             | 334             | 432              |
| 3   | 18               | 128            | 253             | 335             | 421              |
| 4   | 17               | 23             | 71              | 148             | 229              |
| 5   | 17               | 25             | 74              | 122             | 253              |

In the above data, the strip time is defined as the minimum time required at which the core can be taken out from the core box, i.e. from the time the isocyanate solution is added to the mix to the time green hardness of 90 psi is reached.

The above data in Table II clearly show that the self-curing foundary aggregate binder system of this invention produces high tensile strengths of from 229 psi to 432 psi, depending on the solvent and foundry sand used, without the aid of a catalyst, the strip time of each sample being constant and within a desirable workable foundry range. The data also shows that the most desirable solvents are mixtures of aromatic hydrocarbons.

EXAMPLE III 64.8 percent by weight commercially available polyol (Thanol R-650X)* was mixed with 35 percent by weight aromatic solvent and 0.2 percent by weight Silane A-1102 and the total mixture was blended into foundry sand. Polyisocyanate was then added, using the procedure set forth in Example II.

*Manufactured by Jefferson Chemical

The following data was obtained using the Standard AFS tensile specimen with a strip time of 15 minutes:

TABLE III

Tensile Strength vs. Time

| Time (hrs.) | Tensile Strength (psi) |
|-------------|------------------------|
| 1           | 104                    |
| 2           | 180                    |
| 4           | 231                    |
| 24          | 339                    |

EXAMPLE IV

The following runs were made using the polyol binder resin system of runs 1-5 described in Tables I and II, to which different types of accelerator were added. The amount of accelerator used is shown in Table IV, the amount of accelerator being based on the weight of the polyol binder resin.

The foundry aggregate-binder resin mix was prepared by introducing accelerator simultaneously with the binder into the sand and mixed thoroughly, and the polyisocyanate was added according to the procedure described in Example II.

TABLE IV

Amount of Accelerator Added to Foundry Aggregate-Binder Resin Mix

| Run | 12% Mn Octoate | Dabco[1] DC-1 | Dabco[2] DC-2 | Dabco[3] R-8020 | Aromatic[4] 150 |
|-----|----------------|---------------|---------------|-----------------|-----------------|
| 7   | 1%             |               |               |                 |                 |
| 8   |                | 1%            |               |                 |                 |
| 9   |                |               | 1%            |                 |                 |
| 10  |                |               |               | 1%              |                 |
| 11  | 0.19%          |               |               | 0.37%           | 0.94%           |

[1] DC-1 - mixture of organic salts of tertiary amine, an organo metallic compound in an organic solvent.
[2] DC-2 - quaternary amine salt
[3] R-8020 - blend of 20% triethylenediamine, 80% dimethyl ethanolamine
[4] 150 - blend of aromatic hydrocarbon solvents manufactured by Exxon Chemical Co.

The results of the addition of accelerator on the curing of the foundry aggregate binder resin mix are shown in Table V.

TABLE V

Effect of Accelerator on Curing Characteristics

| Run | Strip Time (min) | 1 hr. Tensile | 2 hrs. Tensile | 4 hrs. Tensile | 24 hrs. Tensile |
|-----|------------------|---------------|----------------|----------------|-----------------|
| 7   | 7                | 184           | 184            | 209            | 222             |
| 8   | 6                | 211           | 212            | 207            | 224             |
| 9   | 4                | 196           | 190            | 166            | 174             |
| 10  | 7                | 310           | 301            | 285            | 309             |
| 11  | 9                | 271           | 300            | 305            | 264             |

Table V shows that the addition of small amounts of accelerator to runs 1 through 5 of Example II made a substantial reduction in the strip time while still producing good green strength tensile strengths.

EXAMPLE V

A polyol product was prepared by propoxylation of a phenol formaldehyde resin to an OH number of 240-250. The propoxylation technique was similar to that described in Example I, except that ethylenediamine and diethanolamine are not present in the reaction vessel.

A foundry resin was prepared having 64.8% by weight of polyol product, 35.0% by weight of aromatic solvent 150, and 0.2% by weight of Silane A-1102. The accelerator used was Dabco DC-2 and the polyisocyanate was a solution of 85% Mondur MR and 15% aromatic solvent.

A foundry aggregate-binder resin mix was prepared by introducing 2% of accelerator based on the weight of the polyol product simultaneously with the binder product into the sand and mixed thoroughly. The polyisocyanate was added and mixed according to the procedure described in Example II.

The aggregate-binder resin mix showed a strip time of 5 minutes with the tensile strength development as shown in Table VI.

TABLE VI

| Tensile Strength vs. Time | |
|---|---|
| Time (Hr.) | Tensile Strength (psi) |
| 1 hr. | 177 |
| 2 hrs. | 166 |
| 4 hrs. | 148 |
| 24 hrs. | 187 |

When the phenolic based alkoxy polyol is used alone with an accelerator in the aggregate binder resin mix, a low strip time, a high one-hour green tensile strength, and a high final 24-hour tensile strength were produced.

EXAMPLE VI

The effect of various foundry binder resin levels on the tensile strength development of the system using the binder resin formulation of Run 1 of Example II is shown in Table VII.

TABLE VII

| Tensile Strength for Different Ratios of Binder Resin and Sand | | | |
|---|---|---|---|
| % Resin Binder (BOS)* | 0.68% | 0.75% | 1% |
| % Hardener (BOS) | 0.67% | 0.75% | 1% |
| % Total System (BOS) | 1.35% | 1.5% | 2% |
| Strip time (Min.) | 18 | 18 | 18 |
| 2 hr. tensile (psi) | 237 | 236 | 263 |
| 4 hr. tensile (psi) | 265 | 287 | 295 |
| 24 hr. tensile (psi) | 319 | 340 | 358 |

*BOS - based on weight of sand

EXAMPLE VII

A polyol binder resin was formed using the process of Example II. 63.3% by weight of the resin was mixed with 34.1% by weight of an aromatic solvent, 1.6% by weight of Dabco R-8020, 0.8% by weight of 12% Mn octoate, and 0.2% by weight of Silane A-1102.

Using the procedure of Example II, the polyisocyanate solution was mixed with the polyol binder resin after it had been homogeneously mixed with a foundry sand (Martin-Marietta Sand 50-55 AFS GFN).

The following table VIII shows the temperature dependence of the system:

TABLE VIII

| Tensile Strength vs. Sand Temperature | | | | |
|---|---|---|---|---|
| % resin binder | 0.675% | 0.675% | 0.675% | 0.675% |
| % hardener | 0.675% | 0.675% | 0.675% | 0.675% |
| % total system | 1.35% | 1.35% | 1.35% | 1.35% |
| Sand temp., F | 50 | 70 | 90 | 110 |
| Set time (min) | 8 | 7 | 5 | 3 |
| 1 hr. tensile (psi) | 171 | 150 | 116 | 82 |
| 2 hr. tensile (psi) | 200 | 175 | 156 | 103 |
| 24 hr. tensile (psi) | 203 | 208 | 192 | 133 |

The above data illustrate the effect of temperature of the sand on set time and one, two, and 24-hour tensile strengths, showing that the set time and the tensile strengths decrease as the temperature increases, when equal amounts of binder resin and hardener are used. At high foundry sand temperature, both the one-hour green tensile strength and the 24-hour tensile strength are low.

While the invention has now been described with reference to certain preferred embodiments, and exemplified with respect thereto, the skilled artisan will appreciate that various changes, substitutions, modifications and omissions may be made without departing from the spirit thereof. Accordingly, it is intended that the scope of the present invention be limited solely by that of the following claims.

What is claimed is:

1. A process for preparing self-curing coated aggregate product comprising mixing together to form a homogeneous admixture
   (I) a foundry aggregate containing sand as its major component
   (II) from about 0.1 percent to about 10 percent by weight, based upon the weight of the aggregate used, of a resin binder composition containing an admixture of polyhydroxy polyols with a substantial portion of the polyols containing ether linkages, said polyhydroxy polyols comprising a mixture of
   (a) from about 90 to about 15 percent by weight, based upon the total weight of said resin binder, of a phenolic-based alkoxy polyol having repeating units of the general formula $$\left[ \begin{array}{c} OR \\ | \\ \bigcirc \end{array} - X \right]_N$$

wherein X is $CH_2$ or H and the $CH_2$ group may be in the ortho, meta or para position or mixtures thereof, N is an integer greater than one, and R represents an aliphatic carbinol radical having from 2 to 4 carbon atoms; and
   (b) from about 10 to about 85 percent by weight, based upon the total weight of said resin binder, of an admixture of a tertiary hydroxy diamine polyol of the general formula $$\begin{array}{c} R \\ \diagdown \\ R \end{array} N-CH_2-CH_2-N \begin{array}{c} R \\ \diagup \\ R \end{array}$$

and a tertiary alkoxy hydroxy amine polyol of the general formula $$R-N \begin{array}{c} CH_2-CH_2-O-R \\ \diagdown \\ CH_2-CH_2-O-R \end{array}$$

wherein R represents an aliphatic carbinol radical having 2 to 4 carbon atoms, and
   (III) from about 40 percent to about 60 percent of a polyisocyanate based upon the total weight of component (II), whereby said admixture of said resin binder composition reacts with said polyisocyanate to form on said foundry aggregate a self-curing polyurethane coating.

2. The process for preparing the self-curing coated aggregate product according to claim 1 wherein the ratio of tertiary hydroxy diamine polyol to tertiary alkoxy hydroxy amine polyol ranges from about 10:90 to about 90:10 by weight based upon the total amount of constituent (b) used.

3. The process for preparing the self-curing coated aggregate product according to claim 1 wherein R is an ethyl carbinol radical.

4. The process for preparing the self-curing coated aggregate product according to claim 1 wherein said phenolic based alkoxy polyol is from about 30 percent to about 40 percent of the resin composition.

5. The process for preparing the self-curing coated aggregate product according to claim 1 wherein said polyisocyanate is polymethylene polyphenyl isocyanate.

6. The process for preparing the self-curing coated aggregate product according to claim 1 wherein the resin binder composition has a hydroxyl number of from about 200 to about 600.

7. The process for preparing the self-curing coated aggregate product according to claim 1 wherein said resin binder composition further comprises from 0.1 percent to about 15 percent of an accelerator based upon the weight of (II) used.

8. The process for preparing the self-curing coated aggregate product according to claim 7 wherein the accelerator is selected from the group consisting of manganese octoate, lead napthenate, triethylene diamine, dimethyl ethanol amine and quaternary amine salts and mixtures thereof.

9. The process for preparing the self-curing coated aggregate product according to claim 1 wherein component (II) is further comprised of from about 5 percent to about 50 percent of a solvent based upon the weight of said component.

10. The process for preparing the self-curing coated aggregate product according to claim 9 wherein the solvent is selected from the group consisting of aromatic hydrocarbons, alcohols, butyl cellosolve acetate, butyl carbitol and glycols and mixtures thereof.

11. The process for preparing the self-curing coated aggregate product according to claim 1 wherein component (III) is further comprised of from about 5 percent to about 35 percent of a solvent based upon the weight of said component (III).

12. The process for preparing the self-curing coated aggregate product according to claim 11 wherein the solvent is selected from the group consisting of aromatic hydrocarbons, alcohols, butyl carbitol, butyl cellosolve acetate and glycols and mixtures thereof.

13. A process for preparing a self-curing coated aggregate shape used in producing cast metal foundry products comprising shaping the homogeneous self-curing coated foundry aggregate mixture produced according to claim 1 into a shaped foundry product whereby the said polyisocyanate and the said resin binder composition in the mixture react to form a hard thermoset aggregate composition retaining the shape.

14. The shaped foundry product produced according to claim 13.

15. A self-curing coated aggregate mixture comprising
(I) a foundry aggregate containing sand as its major component (II) from about 0.1 percent to about 10 percent by weight, based upon the weight of the aggregate used, of a resin binder composition containing an admixture of polyhydroxy polyols with a substantial portion of the polyols containing ether linkages, said polyhydroxy polyols comprising a mixture of
(a) from about 90 to about 15 percent by weight, based upon the total weight of said resin binder, of a phenolic-based alkoxy polyol having repeating units of the general formula

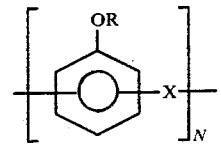

wherein X is $CH_2$ or H, and the $CH_2$ group may be in the ortho, meta or para positions or mixtures thereof, N is an integer greater than one, and R represents an aliphatic carbinol radical having from 2 to 4 carbon atoms; and
(b) from about 10 to about 85 percent by weight, based upon the total weight of said resin binder of an admixture of a tertiary hydroxy diamine polyol of the general formula

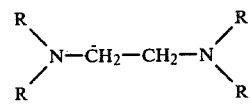

and a tertiary alkoxy hydroxy amine polyol of the general formula

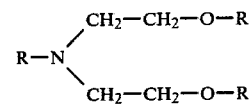

wherein R represents an aliphatic carbinol radical having 2 to 4 carbon atoms; and
(III) from about 40 to about 60 percent by weight, based upon the total weight of component (II) used, of a polyisocyanate, whereby said admixture of said resin binder composition reacts with said polyisocyanate to form on said foundry aggregate a self-curing polyurethane coating.

16. The self-curing coated aggregate mixture according to claim 15 wherein the ratio of tertiary hydroxy diamine polyol to tertiary alkoxy hydroxy amine polyol ranges from about 10:90 to about 90:10 by weight based upon the total amount of constituent (b) used.

17. The self-curing coated aggregate mixture according to claim 15 wherein R is an ethyl carbinol radical.

18. The self-curing coated aggregate mixture according to claim 15 wherein said phenolic-based alkoxy polyol is from about 30 to about 40 percent of the resin composition.

19. The self-curing coated aggregate mixture according to claim 15 wherein said polyisocyanate is polymethylene polyphenyl isocyanate.

20. The self-curing coated aggregate mixture according to claim 15 wherein the resin binder composition has a hydroxyl number of from about 200 to about 600.

21. The coated aggregate according to claim 15 wherein from 0.1 percent to about 15 percent by weight, based upon the weight of (II) used, of a accelerator is added.

22. The coated aggregate according to claim 21 wherein the accelerator is selected from the group consisting of manganese octoate, lead napthenate, triethylene diamine, dimethyl ethanol amine and quaternary amine salts and mixtures thereof.

23. The coated aggregate according to claim 15 wherein (II) has from about 5 percent to about 50 percent by weight, based upon the weight of (II) used, of a solvent added.

24. The coated aggregate according to claim 23 wherein the solvent is selected from the group consisting of aromatic hydrocarbons, alcohols, butyl cellosolve acetate, butyl carbitol, and glycols and mixtures thereof.

25. The coated aggregate according to claim 15 wherein (III) has from about 5 percent to about 35 percent by weight, based upon the weight of (III) used, of a solvent added.

26. The coated aggregate according to claim 25 wherein the solvent is selected from the group consisting of aromatic hydrocarbons, alcohols, butyl cellosolve acetate, butyl carbitol and glycols and mixtures thereof.

27. A process for preparing a self-curing coated foundry aggregate shape comprising shaping the homogeneous self-curing coated aggregate mixture produced according to claim 15 into a shaped product whereby the said polyisocyanate and the said resin binder composition in the mixture react to form a hard thermostat aggregate composition retaining the shape.

28. The shaped product produced according to claim 27.

* * * * *